(12) United States Patent
Urbach

(10) Patent No.: US 6,931,981 B2
(45) Date of Patent: Aug. 23, 2005

(54) HYDRAULIC FLUID CONTROL DEVICE FOR A HYDRAULIC POWER-ASSISTED STEERING SYSTEM

(75) Inventor: Brian A. Urbach, Rochester Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/866,515

(22) Filed: Jun. 11, 2004

(65) Prior Publication Data

US 2004/0250676 A1 Dec. 16, 2004

Related U.S. Application Data

(60) Provisional application No. 60/478,559, filed on Jun. 13, 2003.

(51) Int. Cl.$^7$ .......................... F15B 13/044; F16K 31/02
(52) U.S. Cl. ...................................... 91/459; 251/129.06
(58) Field of Search ............... 91/459, 275; 251/129.06

(56) References Cited

U.S. PATENT DOCUMENTS

| | | | |
|---|---|---|---|
| 1,512,330 A | | 10/1924 | Flanders |
| 3,968,898 A | * | 7/1976 | Beer ..................... 251/129.06 |
| 5,329,766 A | * | 7/1994 | Yamaguchi et al. .......... 60/452 |
| 5,505,276 A | * | 4/1996 | Luibrand ..................... 180/417 |
| 6,478,090 B2 | | 11/2002 | Deaton |
| 6,536,328 B2 | | 3/2003 | Engler |

FOREIGN PATENT DOCUMENTS

WO          97/37878          10/1997

OTHER PUBLICATIONS

Etrema Products, Inc., "TERFENOL–D", pp. 1–5.
"Magnetostrictive Materials Background"; VCLA–Active Material Lab, Geoffrey P. McKnight.

* cited by examiner

Primary Examiner—Thomas E. Lazo
(74) Attorney, Agent, or Firm—MacMillan, Sobanski & Todd, LLC

(57) ABSTRACT

A hydraulic power-assisted steering system (10) includes a pump (12) containing hydraulic fluid. A rack and pinion housing (19) is operatively connected to the pump (12) via a conduit line (16). A hydraulic fluid control device (80) is operatively disposed between the pump (12) and the rack and pinion housing (19), the hydraulic fluid control device (80) having a passageway (82) formed therethrough to allow hydraulic fluid to flow from the pump (12) to the rack and pinion housing (19). An electromagnet (94) is operatively coupled to the fluid control device (80). An electronic control unit (96) is adapted to receive at least one input signal (98, 100) from at least one input source so as to generate an output signal (102) to the hydraulic fluid control device (80) so as to selectively control the flow of hydraulic fluid from the pump (12) to the rack and pinion housing (19). According to the present invention, the fluid control device (80) is formed from a magnetostrictive alloy material which is capable of changing the size of the passageway (82) in the hydraulic fluid control device (80) in response to an applied magnetic field, whereby the electronic control unit (96) is operative to selectively control the physical shape or size of the passageway (82) of the hydraulic fluid control device (80), thereby selectively controlling the flow of hydraulic fluid from the pump (12) to the rack and pinion housing (19).

28 Claims, 3 Drawing Sheets

US 6,931,981 B2

HYDRAULIC FLUID CONTROL DEVICE FOR A HYDRAULIC POWER-ASSISTED STEERING SYSTEM

CROSS REFERENCE TO RELATED APPLICATIONS

This application claims the benefit of U.S. Provisional Application No. 60/478,559 filed Jun. 13, 2003.

BACKGROUND OF THE INVENTION

This invention relates in general to vehicle power steering systems and in particular to an improved hydraulic fluid control device adapted for use in such a vehicle power steering system.

Pumps for pumping fluid from a reservoir to an inlet port of a control valve of a power steering system are known. Devices for controlling the flow of fluid through the inlet ports of such control valves are also known. It would be desirable however, to provide an improved device for controlling the flow of hydraulic fluid from the reservoir to the inlet port of a control valve.

SUMMARY OF THE INVENTION

The present invention relates to a hydraulic power-assisted steering system. The hydraulic power-assisted steering system includes a pump containing hydraulic fluid. A rack and pinion housing is operatively connected to the pump via a conduit line. A hydraulic fluid control device is operatively disposed between the pump and the rack and pinion housing, the hydraulic fluid control device having a passageway formed therethrough to allow hydraulic fluid to flow from the pump to the rack and pinion housing. An electromagnet operatively is coupled to the fluid control device. An electronic control unit is adapted to receive at least one input signal from at least one input source so as to generate an output signal to the hydraulic fluid control device so as to selectively control the flow of hydraulic fluid from the pump to the rack and pinion housing. According to the present invention, the fluid control device is formed from a magnetostrictive alloy material which is capable of changing the size of the passageway in the hydraulic fluid control device in response to an applied magnetic field, whereby the electronic control unit is operative to selectively control the physical shape or size of the passageway of the hydraulic fluid control device, thereby selectively controlling the flow of hydraulic fluid from the pump to the rack and pinion housing.

Other advantages of this invention will become apparent to those skilled in the art from the following detailed description of the invention, when read in light of the accompanying drawings.

DETAILED DESCRIPTION OF THE INVENTION

Figure 1:
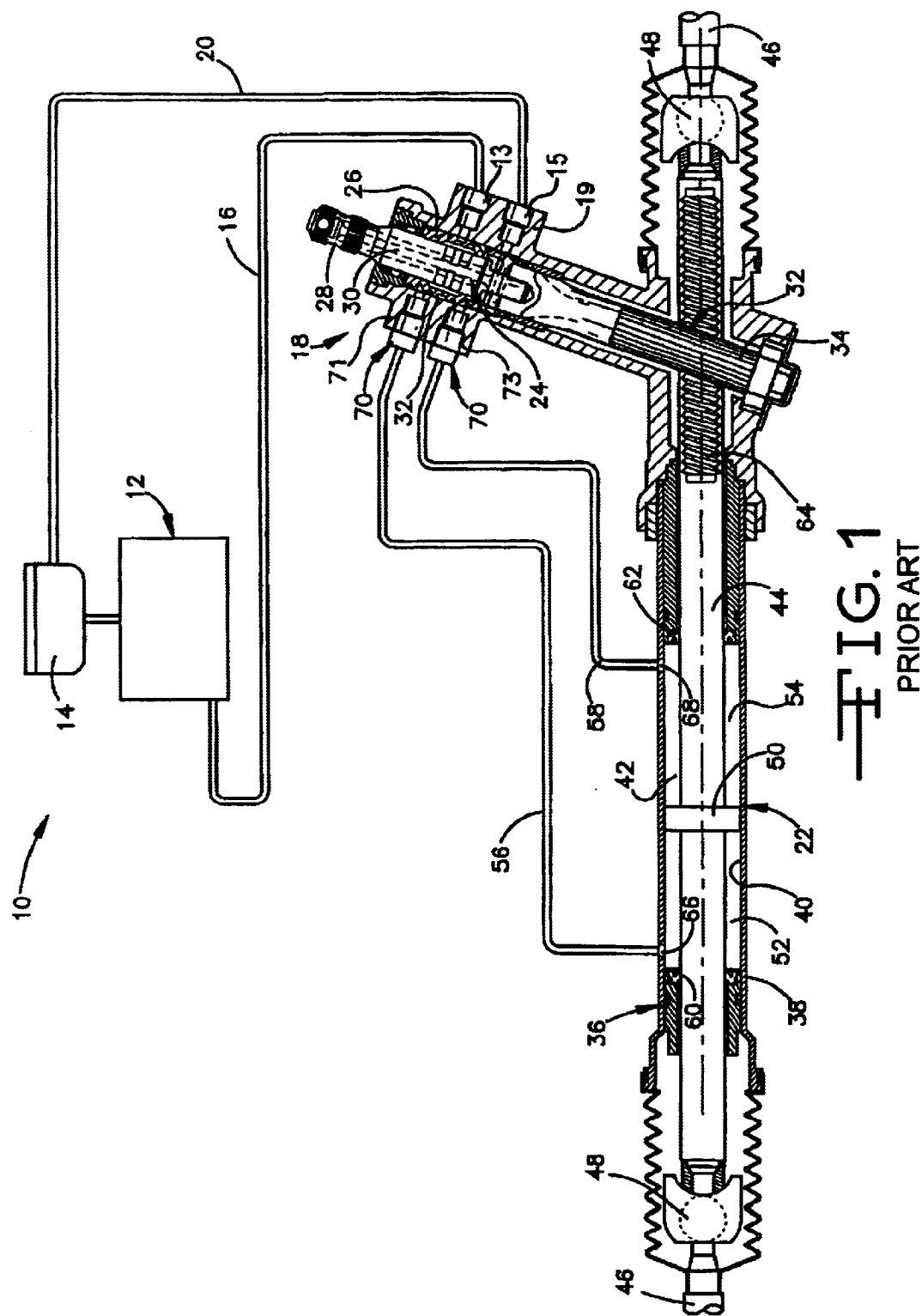
FIG. 1 is a schematic sectional view of a prior art vehicle hydraulic power-assisted rack and pinion steering system.

Referring to FIG. 1, there is illustrated a prior art hydraulic power-assisted rack and pinion steering system, indicated generally at 10, which is adapted to be used in connection with the hydraulic fluid control device of the present invention. The general structure and operation of the rack and pinion steering gear system 10 is conventional in the art. Thus, only those portions of the steering gear system 10 which are necessary for a full understanding of this invention will be explained and illustrated in detail. Also, although this invention will be described and illustrated in connection with the particular rack and pinion steering gear system 10 disclosed herein, it will be appreciated that this invention may be used in connection with other types of rack and pinion steering gears. For example, the portions of the rack and pinion steering gear system which define the present invention can be used with the rack and pinion steering gear system shown in U.S. Pat. No. 6,536,328 to Engler, the disclosure of which is incorporated herein by reference.

The steering system 10 includes a pump 12. The pump 12 is supplied with fluid from a reservoir 14. Conduit 16 provides fluid communication between an outlet of the pump 12 and an inlet port 13 of a control valve 18. Conduit 20 provides fluid communication between an outlet port 15 of the control valve 18 and the reservoir 14.

The control valve 18 directs the fluid received from the pump 12 to a power steering motor 22. The control valve 18 includes a housing 19, a valve core 24, and a valve sleeve 26. The valve core and the valve sleeve are both located within the housing 19. The valve core 24 of the control valve 18 is rotatably connected to an input shaft 28 of the vehicle. A steering wheel (not shown) is associated with one end of the input shaft 28. As the steering wheel is rotated, the valve core 24 is rotated relative to the valve sleeve 26 for directing fluid to the power steering motor 22.

A pinion gear 32 is connected by a torsion bar 30 to an end of the input shaft 28 opposite the steering wheel. The pinion gear 32 includes a plurality of teeth 34. The pinion gear 32 may be rotated by rotation of the steering wheel.

The power steering motor 22 includes a cylindrical housing 36 with an exterior surface 38 and an interior surface 40. The interior surface 40 of the power steering motor housing 36 defines a cylindrical interior chamber 42 within the housing 36.

A cylindrical rack bar 44 extends through the interior chamber 42 of the power steering motor housing 36. The rack bar 44 is connected to the steerable wheels (not shown) of the vehicle through the rods 46, which are connected to the ends of the rack bar 44 by ball joints 48. The rack bar 44 moves linearly through the interior chamber 42 of the housing 36 to turn the steerable wheels of the vehicle.

A cylindrical piston 50 is fixedly connected to the rack bar 44. The piston 50 extends radially outwardly from the rack bar 44 toward the interior surface 40 of the power steering motor housing 36. An annular seal ring (not shown) may extend circumferentially around the piston 50 to seal the piston 50 against the interior surface 40 of the housing 36. The piston 50 divides the interior chamber 42 into two variable volume chamber portions 52 and 54. The volume of each chamber portion 52 and 54 of the power steering motor 22 varies as the piston 50 moves linearly within the power steering motor housing 36.

Conduit 56 hydraulically connects chamber portion 52 to the control valve 18, and conduit 58 hydraulically connects chamber portion 54 to the control valve 18. The control valve 18 directs fluid into the respective conduits 56 and 58 and thus, into the respective chamber portions 52 and 54.

The control valve 18 functions as known to those skilled in the art. When the valve core 24 rotates relative to the valve sleeve 26, a differential pressure arises between the two chamber portions 52 and 54 of the power steering motor 22. When a differential pressure arises between the two chamber portions 52 and 54, the piston 50 moves linearly within the housing 36. The piston 50 moves linearly within the housing 36 until the pressure in the respective chamber portions 52 and 54 equalizes. For example, assuming that chamber portion 52 has a fluid pressure that is greater than the fluid pressure in chamber portion 54, the higher pressure of the chamber portion 52 will act on the piston 50 and cause the piston 50 to move (to the right as shown in FIG. 1).

The piston 50 will move linearly until the differential pressure between the two chamber portions 52 and 54 is eliminated. As the piston 50 moves linearly, the volume of chamber portion 54 decreases. As the volume of chamber portion 54 decreases, a portion of the hydraulic fluid within chamber portion 54 is forced out of chamber portion 54. The hydraulic fluid forced out of the decreasing volume chamber portion 54 returns to the control valve 18 through conduit 58. The control valve 18 directs the fluid to conduit 20, which directs the fluid to reservoir 14.

The power steering motor 22 also includes at least two seals 60 and 62. Seal 60 defines an outer wall of chamber portion 52, and seal 62 defines an outer wall of chamber portion 54. Seals 60 and 62 prevent fluid from leaking from the power steering motor 22 as the rack bar 44 moves linearly through the housing 36.

The pinion gear 32 extends into the housing 36 of a power steering motor 22. The teeth 34 of the pinion gear 32 are in meshing engagement with rack teeth 64 of the rack bar 44.

The power steering motor housing 36 further includes two ports 66 and 68. Port 66 extends from the exterior surface 38 of the housing 36 to the interior surface 40 of the housing 36 to provide fluid communication with chamber portion 52. Port 68 extends from the exterior surface 38 of the housing 36 to the interior surface 40 of the housing 36 to provide fluid communication with chamber portion 54.

The system 10 also includes two damper valves 70. Each damper valve 70 is in fluid communication with the control valve 18 and a respective chamber portion 52 and 54 of the power steering motor 22. In the preferred embodiment, one damper valve 70 is inserted in a first port 71 on the control valve housing 19 and one damper valve is inserted in a second port 73 on the control valve housing 19. Conduit 56 interconnects the damper valve 70 in the first port 71 to a third port 66 of the power steering motor 22. Conduit 58 interconnects to the damper valve 70 in the second port 73 to a fourth port 68 of the power steering motor 22.

When a damper valve 70 is used between the control valve 18 and a respective chamber portion 52 or 54 of a power steering motor 22 in a hydraulic power-assisted steering system 10, the damper valve 70 will resist fluid flow out of a power steering motor 22 and toward the control valve 18. Thus, if the steerable wheels of the vehicle hit a rough portion of the road, the damper valve 70 will resist fluid flow out of a respective chamber portion 52 or 54 and thus, resist movement of the piston 50 in the power steering motor 22. As a result, the steerable wheels of the vehicle will be less likely to be turned by the rough road.

The damper valve 70 will not reduce the response of the power steering motor 22 to steering input from the driver. As the driver rotates the steering wheel, the control valve 18 will direct fluid to a respective chamber portion 52 or 54 of the power steering motor 22. As a result, a pressure differential will be created between the two chamber portions 52 and 54 of the power steering motor 22. This pressure differential causes the piston 50 to move to increase the volume of one chamber portion 52 or 54 and to decrease the volume of the other chamber portion 52 or 54 until the fluid pressures in the two chamber portions 52 and 54 equalizes. As the piston 50 moves to decrease the volume of a chamber portion 52 or 54, the pressure within that chamber portion 52 or 54 increases and fluid is forced out of the chamber portion 52 or 54.

Figure 2:
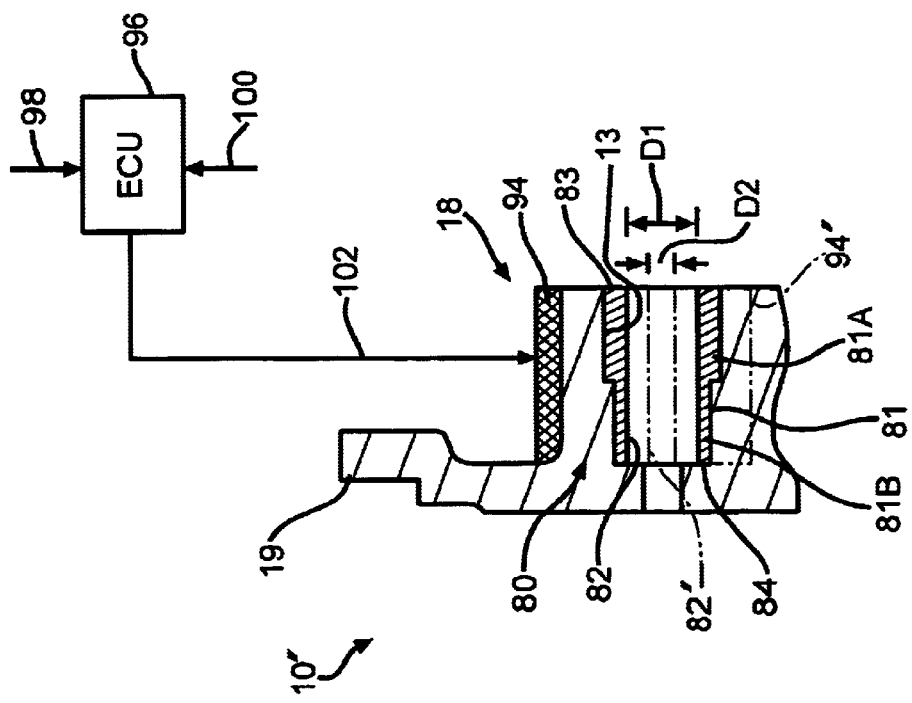
FIG. 2 is an enlarged sectional view of a portion of a rack and pinion steering gear system including a first embodiment of a hydraulic fluid control device constructed in accordance with the present invention and shown installed in an inlet port of the control valve.
Figure 5:
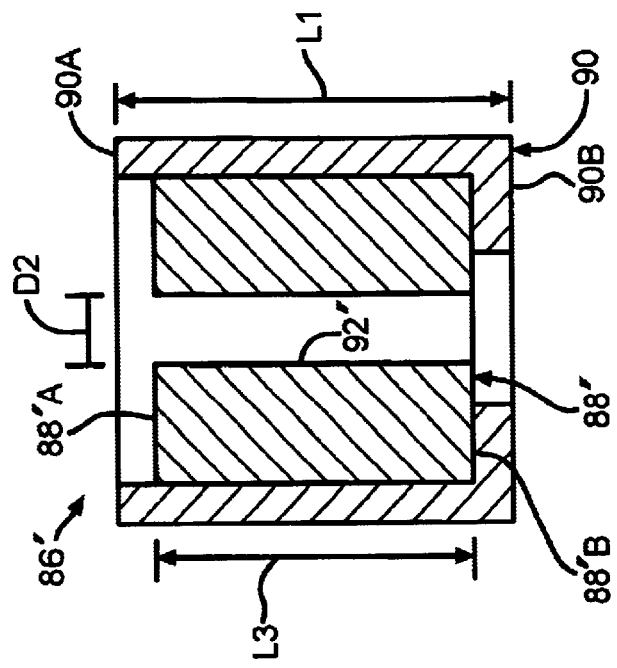
FIG. 5 is a sectional view of the first alternate embodiment of the hydraulic fluid control device illustrated in FIG. 4, showing the hydraulic fluid control device in a second position.
Figure 4:
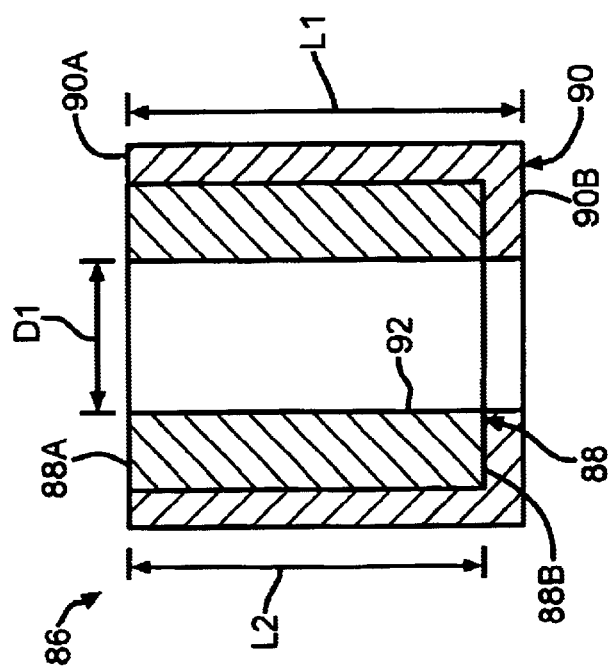
FIG. 4 is a sectional view of a first alternate embodiment of a hydraulic fluid control device constructed in accordance with the present invention.
Figure 6:
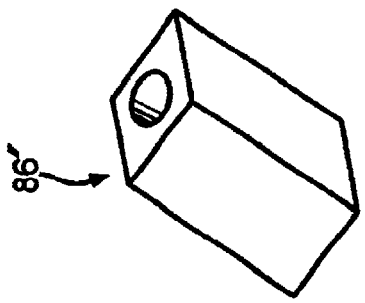
FIG. 6 is a perspective view of a second alternate embodiment of a hydraulic fluid control device constructed in accordance with the present invention.

Referring now to FIG. 2 and using like reference numbers to indicate corresponding parts, there is illustrated a portion of a rack and pinion steering gear system 10' including a first embodiment of a hydraulic fluid control device or restrictor valve, indicated generally at 80, constructed in accordance with the present invention and shown installed in the inlet port 13 of the control valve 18. In the illustrated embodiment, the restrictor valve 80 is preferably substantially cylindrically shaped and includes a fluid passageway 82 extending longitudinally between a first end 83 and a second end 84 thereof. In the exemplary embodiment illustrated in FIG. 2, an outer surface 81 of the restrictor valve 80 is stepped and includes an increased diameter portion 81A and a reduced diameter portion 81B. It will be understood however, that the outer surface 81 can have any desired shape or configuration, such as for example, a substantially circular shape 86, as shown in FIG. 4, and a polygonal shape 86', as shown in FIG. 5.

The control valve 18 further includes an electro-magnet, schematically illustrated in FIG. 2 by reference numeral 94. The electromagnet 94 can be integral with the housing 19 or can be in close proximity therewith. In the illustrated embodiment, one such electromagnet 94 is provided having a preselected size, and is disposed adjacent an outer surface of the housing 19. The electromagnet 94 is preferably secured to the housing 19 in a predetermined location for a purpose to be discussed below. Alternatively, the control valve 18 can include two or more electromagnets 94 and/or the location of the electro-magnet(s) 94 can be other than illustrated if so desired. For example, the electro-magnet can be adjacent the inlet port 13, as shown by a phantom line 94' in FIG. 2, or the electromagnet (not shown) can be configured to substantially surround the inlet port 13.

The steering gear system 10' further includes an electronic control unit (ECU) 96 operatively connected to the electromagnet 94. The ECU 96 is adapted to receive one or more input signals from selected vehicle components and is operative to generate one or more output signals to the electro-magnet 94 of the control valve 18.

The input signals can be from any desired vehicle components, such as, for example, a steering rate sensor signal 98, and a vehicle speed sensor signal 100. Using the input signals 98 and 100, the ECU 96 determines an output signal 102 to be generated to the electro-magnet 94 of the control valve 18. The output signal 102 is in the form of an electric current applied to the electromagnet 94. Alternatively, the number and/or the origination of the input signals 98 and 100 and/or the number of the output signals 102 can be other than illustrated if so desired.

Referring to FIG. 4, an alternate embodiment of the restrictor valve is illustrated generally at 86. The restrictor valve 86 includes a fluid control body or an inner valve body 88 and a substantially rigid fluid control device housing or outer valve housing 90. In the embodiment illustrated in FIG. 4, the valve housing 90 has a first end 90A, a second end 90B, and defines a length L1. The valve body 88 has a first end 88A, a second end 88B, and a fluid passageway 92 extending longitudinally between the first end 88A and the second end 88B thereof. The restrictor valve 86 is selectively actuated between a first position, as shown in FIG. 4, and a second position illustrated generally at 86' in FIG. 5. In the second position, the valve body 88' of the restrictor valve 86' has a second body length L3. The fluid passageway 92' defines a second diameter D2, as will be described in detail below. It will be understood however, that the valve housing 90 can have any desired length L1, including for example, a length smaller than a length L2, L3 of the valve body 88, or larger than a length L2, L3 of the valve body 88. The valve housing 90 can be formed from any suitable substantially rigid material, such as steel or plastic. It will be understood however, that the valve housing 90 can be formed from any other desired metals or non-metals.

The restrictor valve 80, 86 can be secured to the housing 19 of the control valve 18 by any appropriate method. For example, the restrictor valve 80, 86 can be permanently secured to the housing 19 by glue or adhesive, interference fit, or any other suitable means which positively secures the restrictor valve 80, 86 to the housing 19. Alternatively, the restrictor valve 80, 86 can be removably secured for servicing, such as by threads.

Figure 3:
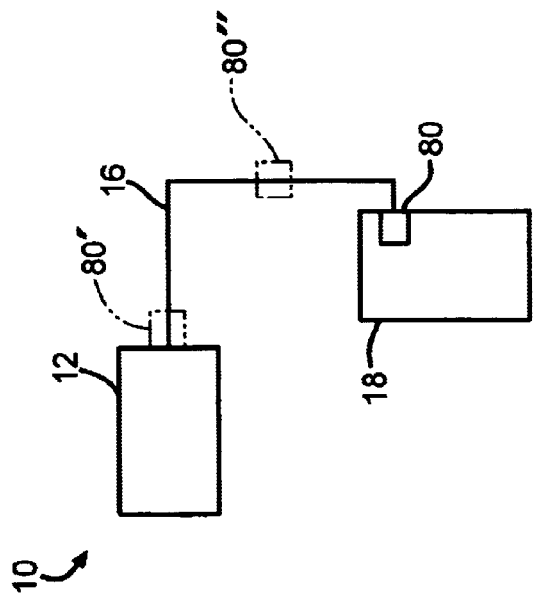
FIG. 3 is a schematic view of a rack and pinion steering gear system including the first embodiment of the hydraulic fluid control device constructed in accordance with the present invention.

The restrictor valve 80, 86 can also be disposed at any suitable location between the pump 12 and the control valve 18. For example, the restrictor valve 80 can be disposed in or adjacent an outlet of the pump 12, as shown by a phantom line 80' in FIG. 3. Additionally, the restrictor valve 80 can be disposed at any desired location in the conduit 16, as shown by a phantom line 80" in FIG. 3.

Preferably, the restrictor valve 80 and the valve body 88 are formed from a suitable magnetostrictive alloy material that changes its shape when in the presence of a magnetic field. An example of such a suitable material is Terfenol-D® which is available from ETREMA Products, Inc., of Ames, Iowa. Alternatively, the restrictor valve 80 and the valve body 88 can be formed from any other suitable magnetostrictive material which are capable of changing their dimensions in response to an applied magnetic field if so desired.

Referring again to FIG. 2, the electric current 102 applied to the electro-magnet 94 is selectively controlled by the ECU 96 to thereby selectively control the size and/or shape of the fluid passageway 82 of the restrictor valve 80. For example, prior to applying an electric current to the electromagnet 94, the fluid passageway 82 defines a first diameter D1. After applying an electric current to the electromagnet 94, the fluid passageway 82 defines a second diameter D2, which is illustrated as being less than the first diameter D1, as shown by phantom lines 82' in FIG. 2. Thus, it will be understood that the restrictor valve 80 can be selectively controlled by the ECU 96 to selectively control the flow of hydraulic fluid through the restrictor valve 80 to the inlet port 13 of the control valve 18. The exact dimensions of diameters D1 and D2 are dependent upon particular vehicular operating control characteristics. Generally, the first diameter D1 is within the range of from about 3.0 mm to about 9.0 mm. Preferably, the first diameter D1 is within the range of from about 5.0 mm to about 7.0 mm. More preferably, the first diameter D1 is about 6 mm. Generally, the second diameter is within the range of from about 0.5 mm to about 6.5 mm. Preferably, the second diameter D2 is within the range of from about 2.5 mm to about 4.5 mm. More preferably, the second diameter D2 is about 3.5 mm. The restrictor valve 80, 86 have been shown enlarged for purposes of illustration and discussion only. It will be understood that the restrictor valves 80, 86 can have any desired outer dimension, shape or configuration, such as for example a generally square shape as shown by a restrictor valve 87 in FIG. 5, which is suitable for use in connection with the hydraulic fluid control device of the present invention.

In the exemplary embodiment illustrated in FIG. 2, the fluid passageway 82 is shown having the first diameter D1. Phantom lines D2 illustrate the smaller second diameter D2. Preferably, during operation, the first diameter D1 is reduced by about 50 percent. It will be understood however, that the application of the electric current 102 to the electromagnet 94 can also cause the fluid passageway 82 to move between a smaller diameter, such as the second diameter D2, to a larger diameter, such as the first diameter D1. Thus, it can be understood that the restrictor valve 80 of the present invention can be selectively actuated or operated to either selectively increase the fluid passageway 82 or to selectively decrease the fluid passageway 82. It will be further understood that the second end 84 of the restrictor valve 80 can be attached to the housing 19 by any desired means, such as pinning or with an adhesive.

Referring to FIG. 4, the fluid passageway 92 of the valve body 88 will be preferably formed in the first position 86, such that the diameter D1 is the maximum diameter required for the maximum desired rate of fluid flow through the input port 13. In the first position, the restrictor valve 86 preferably has the first body length L2, such that the first end 88A of the body 88 does not extend outward of the first end 90A of the valve housing 90. It will be understood however, that the first body length L2 can be any desired length. When the electric current 102 is applied to the electromagnet 94, the restrictor valve 86 moves to the second position.

In the second position 86', as shown in FIG. 5, the fluid passageway 92' of the valve body 88' preferably has the reduced diameter D2 and the reduced second body length L3. When the electric current is removed from the electromagnet 94, the restrictor valve 86 returns to the first position, as shown in FIG. 4. It will be understood that the length L1 of the valve housing 90 is preferably greater than the second body length L3 of the valve body 88' when the restrictor valve 86 is in the second position 86'. Such greater length L1 of the valve housing 90 allows for expansion of the valve body 88 within the valve housing 90 when the valve body moves from the second position 88' as shown in FIG. 5 to the first position 88 as shown in FIG. 4. It will be further understood that the second end 90B of the valve housing 90 can be attached to the housing 19 by any desired means, such as pinning or with an adhesive.

The principle and mode of operation of this invention have been described in its preferred embodiments. However, it should be noted that this invention may be practiced otherwise than as specifically illustrated and described without departing from its scope.

What is claimed is:

1. A hydraulic power-assisted steering system comprising:
   a pump containing hydraulic fluid;
   a rack and pinion housing operatively connected to said pump via a conduit line;
   a hydraulic fluid control device operatively disposed between said pump and said rack and pinion housing, said hydraulic fluid control device having a passageway formed therethrough to allow hydraulic fluid to flow from said pump to said rack and pinion housing;
   an electromagnet operatively coupled to said fluid control device; and
   an electronic control unit adapted to receive at least one input signal from at least one input source so as to generate an output signal to said hydraulic fluid control device so as to selectively control the flow of hydraulic fluid from said pump to said rack and pinion housing;
   wherein said fluid control device is formed from a magnetostrictive alloy material which is capable of changing the size of said passageway in said hydraulic fluid control device in response to an applied magnetic field, whereby said electronic control unit is operative to selectively control the physical shape or size of said passageway of said hydraulic fluid control device thereby selectively controlling the flow of hydraulic fluid from said pump to said rack and pinion housing.

2. The hydraulic fluid control device according to claim 1, wherein said at least one input signal from at least one input source includes at least one input signal from a vehicle speed sensor and a steering rate sensor.

3. The hydraulic fluid control device according to claim 1, wherein said electro-magnet is integral with said rack and pinion housing.

4. The hydraulic fluid control device according to claim 1, wherein said electromagnet is disposed adjacent an inlet port of said rack and pinion housing.

5. The hydraulic fluid control device according to claim 1, wherein said electromagnet is disposed adjacent said pump.

6. The hydraulic fluid control device according to claim 1, wherein said electromagnet is disposed in said conduit line.

7. The hydraulic fluid control device according to claim 1, wherein said electro-magnet defines a portion of said inlet port.

8. The hydraulic fluid control device according to claim 1, wherein said fluid control device includes a fluid control device housing and a fluid control body disposed within said fluid control device housing.

9. The hydraulic fluid control device according to claim 8, wherein said body is formed from said magnetostrictive alloy material.

10. The hydraulic fluid control device according to claim 8, wherein said fluid control device housing is formed from a substantially rigid material.

11. The hydraulic fluid control device according to claim 10, wherein said substantially rigid material is formed from other than a magnetostrictive alloy material.

12. The hydraulic fluid control device according to claim 1, wherein said magnetostrictive alloy material is capable of changing a diameter of said passageway in response to said applied magnetic field.

13. The hydraulic fluid control device according to claim 12, wherein said magnetostrictive alloy material is capable of changing said diameter of said passageway between a first diameter and a second diameter.

14. The hydraulic fluid control device according to claim 13, wherein said first diameter is larger than said second diameter.

15. A hydraulic fluid control device adapted for use in a hydraulic power-assisted steering system, said hydraulic fluid control device comprising:
   a hydraulic fluid control device operatively disposed between a pump and a rack and pinion housing of the hydraulic power-assisted steering system, said hydraulic fluid control device having a passageway formed therethrough to allow hydraulic fluid to flow from the pump to the rack and pinion housing;
   an electromagnet operatively coupled to said fluid control device; and
   an electronic control unit adapted to receive input at least one input signal from at least one input source so as to generate an output signal to said hydraulic fluid control device so as to selectively control the flow of hydraulic fluid the pump to the rack and pinion housing;
   wherein said fluid control device is formed from a magnetostrictive alloy material which is capable of changing the size of said passageway in said hydraulic fluid control device in response to an applied magnetic field, whereby said electronic control unit is operative to selectively control the physical shape or size of said passageway of said hydraulic fluid control device thereby selectively control the flow of hydraulic fluid from the pump to the rack and pinion housing.

16. The hydraulic fluid control device according to claim 15, wherein said at least one input signal from at least one input source includes at least one input signal from a vehicle speed sensor and a steering rate sensor.

17. The hydraulic fluid control device according to claim 15, wherein said electromagnet is integral with said rack and pinion housing.

18. The hydraulic fluid control device according to claim 15, wherein said electromagnet is disposed adjacent an inlet port of said rack and pinion housing.

19. The hydraulic fluid control device according to claim 18, wherein said electromagnet defines a portion of said inlet port.

20. The hydraulic fluid control device according to claim 15, wherein said electromagnet is disposed adjacent said pump.

21. The hydraulic fluid control device according to claim 15, wherein said electromagnet is disposed in a conduit line operatively connecting said rack and pinion housing and said pump.

22. The hydraulic fluid control device according to claim 15, wherein said fluid control device includes a fluid control device housing and a fluid control body disposed within said fluid control device housing.

23. The hydraulic fluid control device according to claim 22, wherein said body is formed from said magnetostrictive alloy material.

24. The hydraulic fluid control device according to claim 22, wherein said fluid control device housing is formed from a substantially rigid material.

25. The hydraulic fluid control device according to claim 24, wherein said substantially rigid material is formed from other than a magnetostrictive alloy material.

26. The hydraulic fluid control device according to claim 15, wherein said magnetostrictive alloy material is capable of changing a diameter of said passageway in response to said applied magnetic field.

27. The hydraulic fluid control device according to claim 26, wherein said magnetostrictive alloy material is capable of changing said diameter of said passageway between a first diameter and a second diameter.

28. The hydraulic fluid control device according to claim 27, wherein said first diameter is larger than said second diameter.

* * * * *